United States Patent
Steiner et al.

(10) Patent No.: US 11,919,584 B2
(45) Date of Patent: Mar. 5, 2024

(54) FLIP-FLOP TRACK ROLLERS

(71) Applicant: Caterpillar Inc., Peoria, IL (US)

(72) Inventors: Kevin L. Steiner, Tremont, IL (US); Eric Bernard Weisbruch, Edwards, IL (US); Daniel I. Knobloch, Morton, IL (US); Timothy Michael Nenne, Germantown Hills, IL (US)

(73) Assignee: Caterpillar Inc., Peoria, IL (US)

( * ) Notice: Subject to any disclaimer, the term of this patent is extended or adjusted under 35 U.S.C. 154(b) by 668 days.

(21) Appl. No.: 16/774,539

(22) Filed: Jan. 28, 2020

(65) Prior Publication Data

US 2021/0229762 A1    Jul. 29, 2021

(51) Int. Cl.
*B62D 55/15* (2006.01)
*B62D 55/18* (2006.01)

(52) U.S. Cl.
CPC ............. *B62D 55/15* (2013.01); *B62D 55/18* (2013.01)

(58) Field of Classification Search
CPC ...................................................... B62D 55/15
See application file for complete search history.

(56) References Cited

U.S. PATENT DOCUMENTS

| | | | |
|---|---|---|---|
| 4,294,482 A | 10/1981 | Scheffel et al. | |
| 5,333,710 A * | 8/1994 | Oertley | B62D 55/104 |
| | | | 180/9.1 |
| 5,704,697 A | 1/1998 | Ketting et al. | |
| 5,752,574 A * | 5/1998 | Oertley | B62D 55/14 |
| | | | 180/9.1 |
| 9,481,411 B2 | 11/2016 | Meyer et al. | |
| 2005/0040705 A1* | 2/2005 | Yamamoto | B62D 55/15 |
| | | | 305/136 |
| 2016/0244111 A1* | 8/2016 | Schierschmidt | B62D 55/06 |
| 2017/0369111 A1* | 12/2017 | Recker | B62D 55/14 |
| 2018/0208257 A1 | 7/2018 | Peterson | |

FOREIGN PATENT DOCUMENTS

| | | | | |
|---|---|---|---|---|
| CN | 1817716 A | * | 8/2006 | ............ B62D 55/15 |
| EP | 0725002 A1 | | 8/1996 | |
| EP | 1088748 A2 | * | 4/2001 | ............ B62D 55/08 |
| WO | 2017053643 | | 3/2017 | |
| WO | WO-2017053643 A1 | * | 3/2017 | ............ B62D 55/08 |
| WO | WO-2017221764 A1 | * | 12/2017 | ............ B62D 55/14 |

\* cited by examiner

*Primary Examiner* — Jacob D Knutson

(57) ABSTRACT

A track roller includes a body having a revolved configuration defining an axis of rotation, a radial direction, and a circumferential direction disposed about the axis of rotation. A first axial extremity and a second axial extremity are disposed along the axis of rotation. The body of revolution further includes a first rim portion disposed proximate to the first axial extremity, and a second rim portion disposed proximate to the second axial extremity. An outboard track contact surface is disposed axially proximate to the first rim portion, and an inboard slot is disposed axially proximate to the second rim portion.

15 Claims, 7 Drawing Sheets

FLIP-FLOP TRACK ROLLERS

TECHNICAL FIELD

The present disclosure relates to track rollers used in the undercarriage of heavy equipment using endless track drives. Specifically, the present disclosure relates to a track roller and track link interface used in such undercarriages that may be less prone to wear.

BACKGROUND

In many current applications, track rollers support the weight of heavy equipment such as those using endless track drives in the earth moving, construction, and mining industries, etc. Often, a bearing is supplied between the shaft on which the track roller rotates and the track roller. The pressure exerted on the track roller or the bearing may cause the track roller, track ling or bearing to wear.

Eventually, the track roller or track link may experience spalling or similar wear patterns. As a result, the machine is often taken out of service to replace the track roller or track link, or otherwise perform maintenance on the undercarriage of the machine. This may result in unwanted increased costs and reduced production for an economic endeavor using the machine.

U.S. Pat. No. 5,704,697 to Ketting discloses a rotatable drive/support element having a support surface that is used with a chain link having a hardened running surface extending in and adapted to ride in a travel direction on the support surface and a side surface also extending in the travel direction and normally out of contact with the element. The running surface has a predetermined width b and is formed of at least one edge region of an outwardly convex arcuate shape seen in the travel direction having a radius R of curvature and a respective corner region extending from the edge region to the side region of an outwardly convex arcuate shape see in the travel direction having a radius r of curvature. Ketting also discloses a ration of r/b that ranges from about 0.05 to 0.11, and preferably from about 2.4 to 3.1

As can be understood, the '697 patent is directed to arcuate configured interfaces between the track link and track roller or the like in a purported effort to reduce contact pressures and the spalling of the track roller or the chain link. However, in some applications this design does not provide enough of a reduction in spalling.

SUMMARY

A track roller member according to an embodiment of the present disclosure is provided. The track roller may comprise a body including a revolved configuration defining an axis of rotation, a radial direction, and a circumferential direction disposed about the axis of rotation. A first axial end may be disposed along the axis of rotation, and a second axial end may be disposed along the axis of rotation. A half-tread portion may include a first track contact region including a first track contact surface that is disposed proximate to the first axial end, and may define a first void disposed axially between the first track contact region and the second axial end.

A track roller member according to another embodiment of the present disclosure is provided. The track roller member may comprise a body including a revolved configuration defining an axis of rotation, a radial direction, and a circumferential direction that is disposed about the axis of rotation. The body may define a proximate axial end that is disposed along the axis of rotation, and a distal axial end that is disposed along the axis of rotation. A half-tread portion including a first track interface region may have an interface surface that is disposed proximate to the distal axial end, and may define a first aperture that is disposed axially between the first track interface region and the proximate axial end.

A track roller joint assembly according to an embodiment of the present disclosure is provided. The assembly may comprise a track roller including a body of revolution defining an axis of rotation, a circumferential direction disposed about the axis of rotation, a radial direction extending normal to the axis of rotation, a first axial extremity that is disposed along the axis of rotation, a second axial extremity that is disposed along the axis of rotation, a first rim portion that is disposed proximate to the first axial extremity, a second rim portion that is disposed proximate the second axial extremity, and an outboard track contact surface that is disposed axially proximate to the first rim portion. The body of revolution may further define an exterior, a thru-hole that is in communication with the exterior and extending axially through the body of revolution, and an inboard slot that is disposed axially proximate to the second rim portion. A shaft may be disposed in the thru-hole, and a radial bearing may be disposed in the thru-hole radially contacting the shaft.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings.

DETAILED DESCRIPTION

Figure 1:
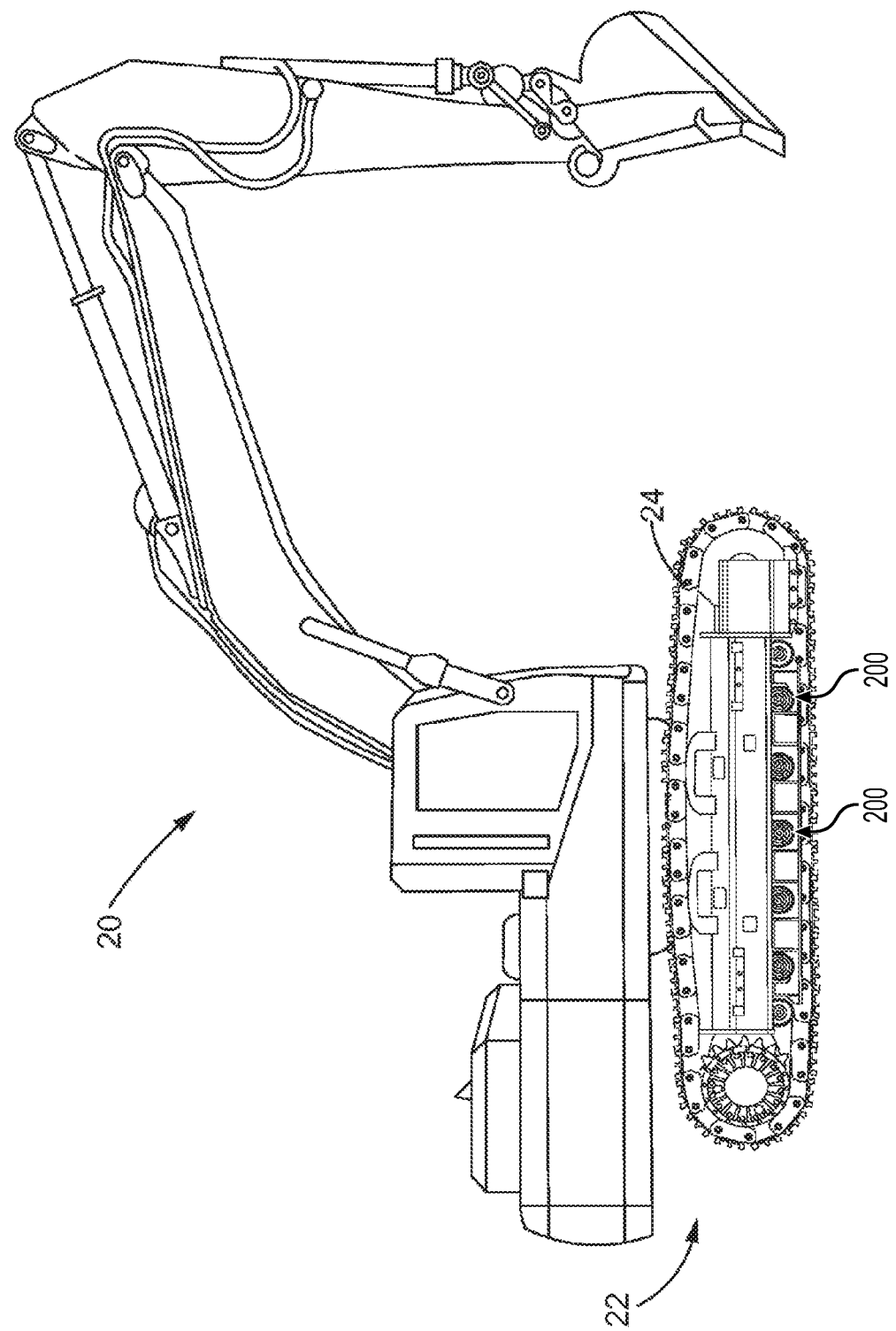
FIG. 1 is a perspective view of a machine such as an excavator that may employ a track assembly (may also be referred to as an undercarriage assembly) with a track roller with alternating contact regions that engage the outboard links versus the inboard links according to an embodiment of the present disclosure.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or by a prime for example, 100', 100" etc. It is to be understood that the use of letters or primes immediately after a reference number indicates that these features are similarly shaped and have similar function as is often the case when geometry is mirrored about a plane of symmetry. For ease of explanation in this specification, letters and primes will often not be included herein but may be shown in the drawings to indicate duplications of features, having similar or identical function or geometry, discussed within this written specification.

A roller joint assembly that may use a track roller or a track roller member according to various embodiments of the present disclosure will now be described. In some embodiments, the track roller is a solid body (e.g. having unitary construction). In other embodiments, the tracker roller is split into two or more track roller members that are assembled together to form the track roller or track roller joint assembly, etc. Other configurations for the track roller, track roller member, and track roller joint assembly are possible in other embodiments of the present disclosure.

FIG. 1 shows an embodiment of a tracked machine 20 in the form of an excavator that includes an embodiment of a track roller joint assembly 200 constructed in accordance with principles of the present disclosure. Among other uses, an excavator can be used to remove material using a bucket from a work site.

More specifically, FIG. 1 illustrates a machine 20 including an undercarriage system 22 with a track assembly 24, consistent with certain embodiments of the present disclosure. It is to be understood that although the machine 20 is illustrated as an excavator, the machine 20 may be of any other type that includes a tracked undercarriage system 22. As used herein, the term "machine" refers to a mobile machine that performs a driven operation involving physical movement associated with a particular industry, such as, earthmoving, construction, landscaping, forestry, agriculture, etc.

While the arrangement is illustrated in connection with an excavator, the arrangement disclosed herein has universal applicability in various other types of machines commonly employ track systems, as opposed to wheels. The term "machine" may refer to any machine that performs some type of operation associated with an industry such as mining, earth moving or construction, or any other industry known in the art. For example, the machine may be a hydraulic mining shovel, a wheel loader, a cable shovel, a track type tractor, a dozer, or dragline or the like. Moreover, one or more implements may be connected to the machine. Such implements may be utilized for a variety of tasks, including, for example, lifting and loading.

Figure 2:
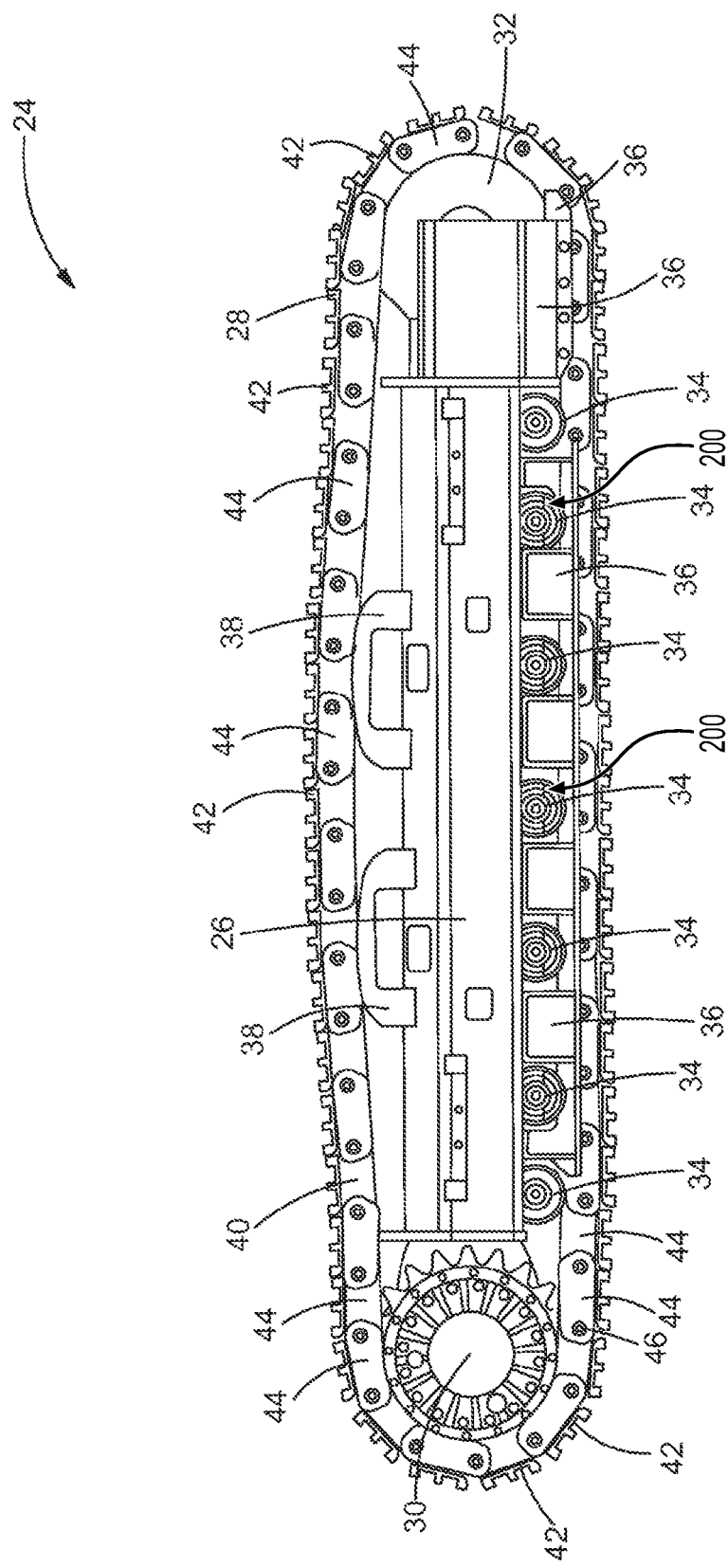
FIG. 2 is a side view of the undercarriage assembly for the machine of FIG. 1.
Figure 3:
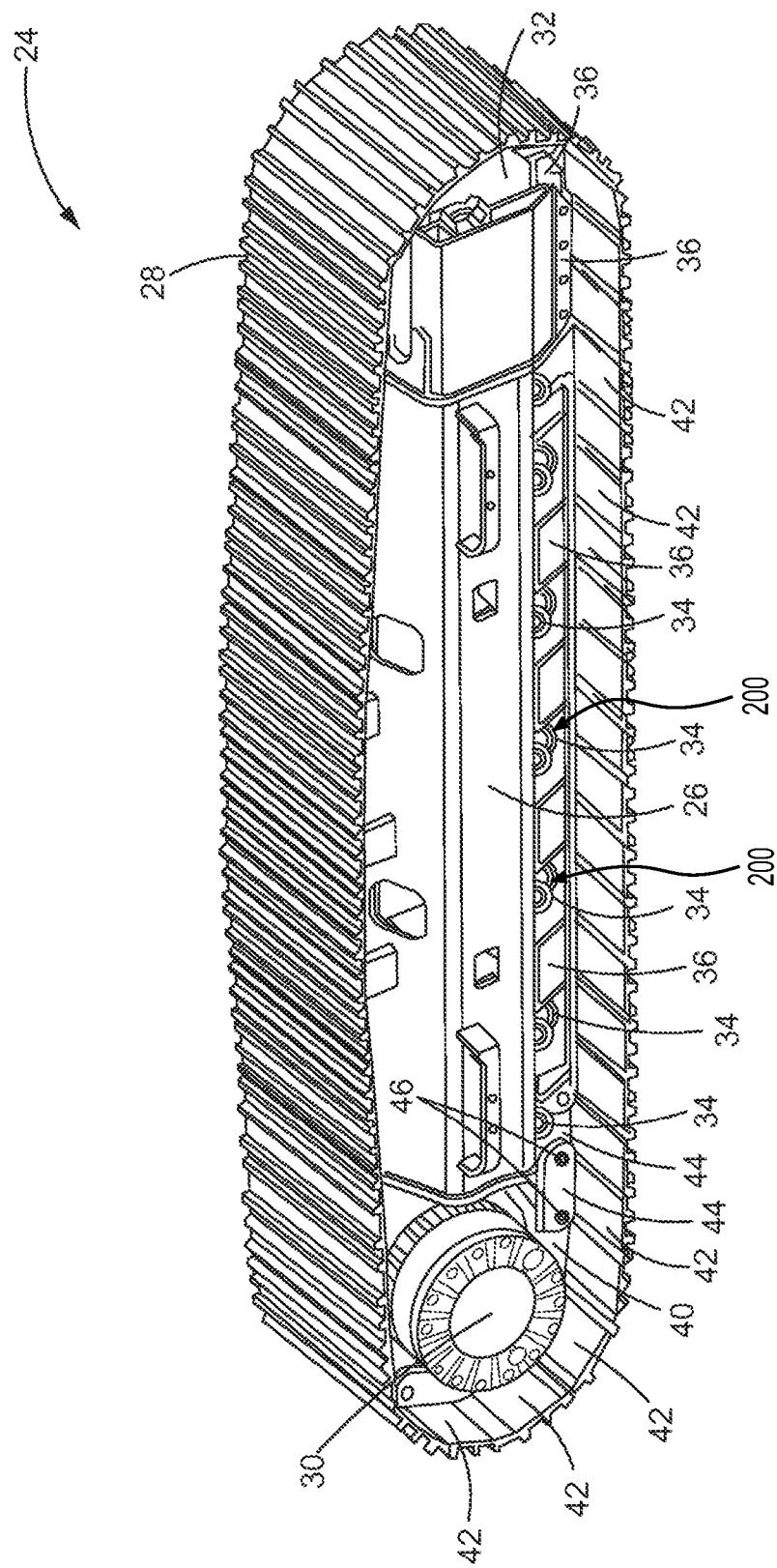
FIG. 3 is a perspective view of the undercarriage assembly of FIG. 2.

The undercarriage system 22 may be configured to support the machine 20 and move the machine 20 along the ground, road, and other types of terrain. As shown in FIGS. 2 and 3, the track assembly 24 of the undercarriage system 22 may include a track roller frame 26, various guiding components connected to the track roller frame 26, and an endless track 28 engaging the guiding components. The guiding components may guide the track 28 and include a drive sprocket 30, an idler 32, rollers 34, track guides 36, and carriers 38, although other components may be used The track 28 may include a link assembly 40 with a plurality of shoes 42 secured thereto. The link assembly 40 may form a flexible backbone of the track 28, and the shoes 42 may provide traction on the various types of terrain. The link assembly 40 may extend in an endless chain around the drive sprocket 30, the rollers 34, the idler 32, and the carriers 38.

As shown in FIGS. 2 and 3, track shoes 42 may be secured to the perimeter of link assembly 40. For example, one shoe 42 may be attached to each laterally spaced pair of links 44. The track shoes 42 may be connected to the links 44 via various methods (e.g. welding, fastening, etc.).

Figure 4:
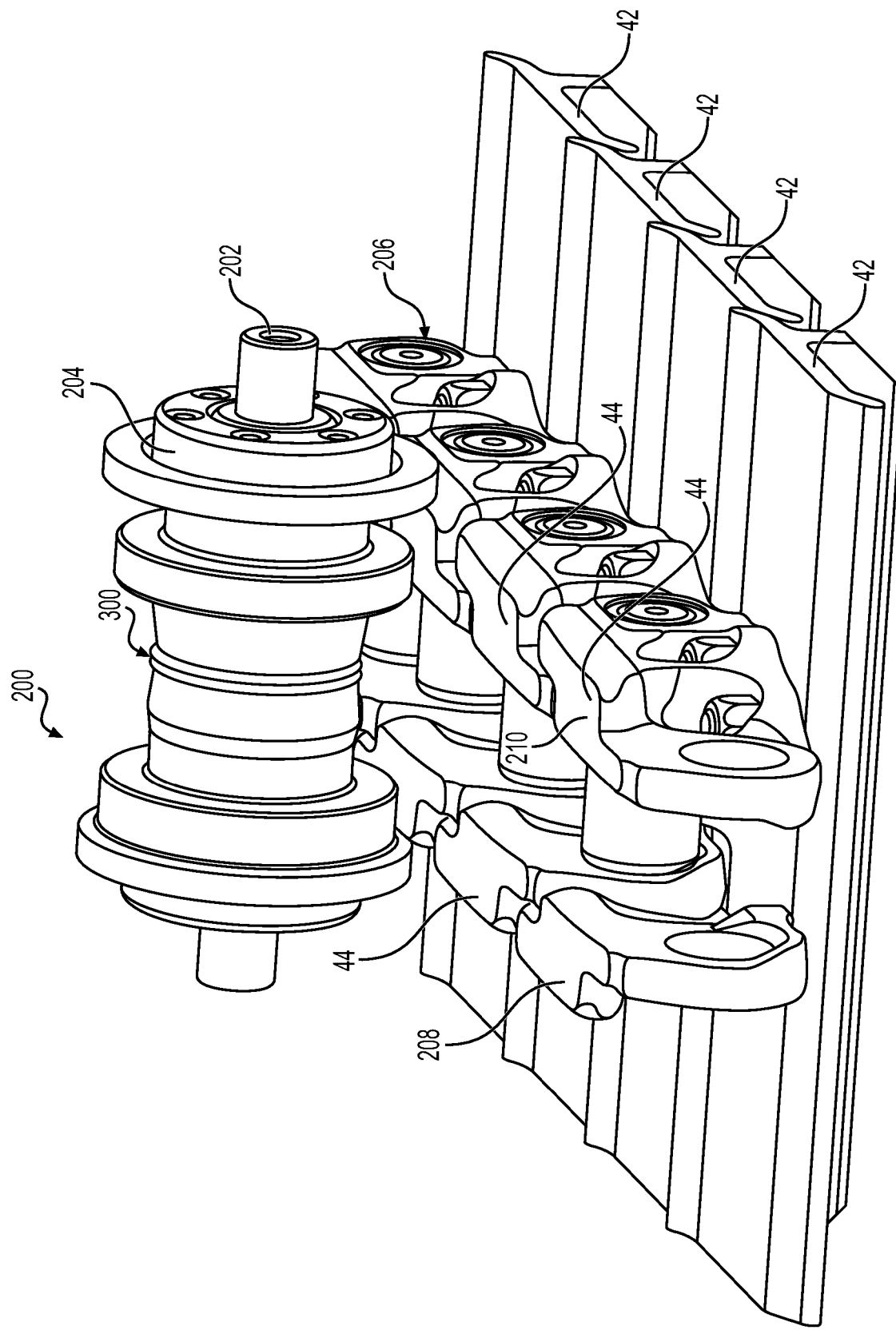
FIG. 4 is a perspective view of a track assembly mating with a track roller with alternating contact regions that engage the outboard links versus the inboard links according to an embodiment of the present disclosure.

As best understood with reference to FIGS. 1 and 4, a plurality of track roller joint assemblies 200 may be provided that guide the track chain assembly. The track roller joint assembly 200 includes shaft 202 extending from the frame (not shown in FIG. 4) of the undercarriage system 22 of the machine 20 on which the track roller 300 rotates.

Figure 5:
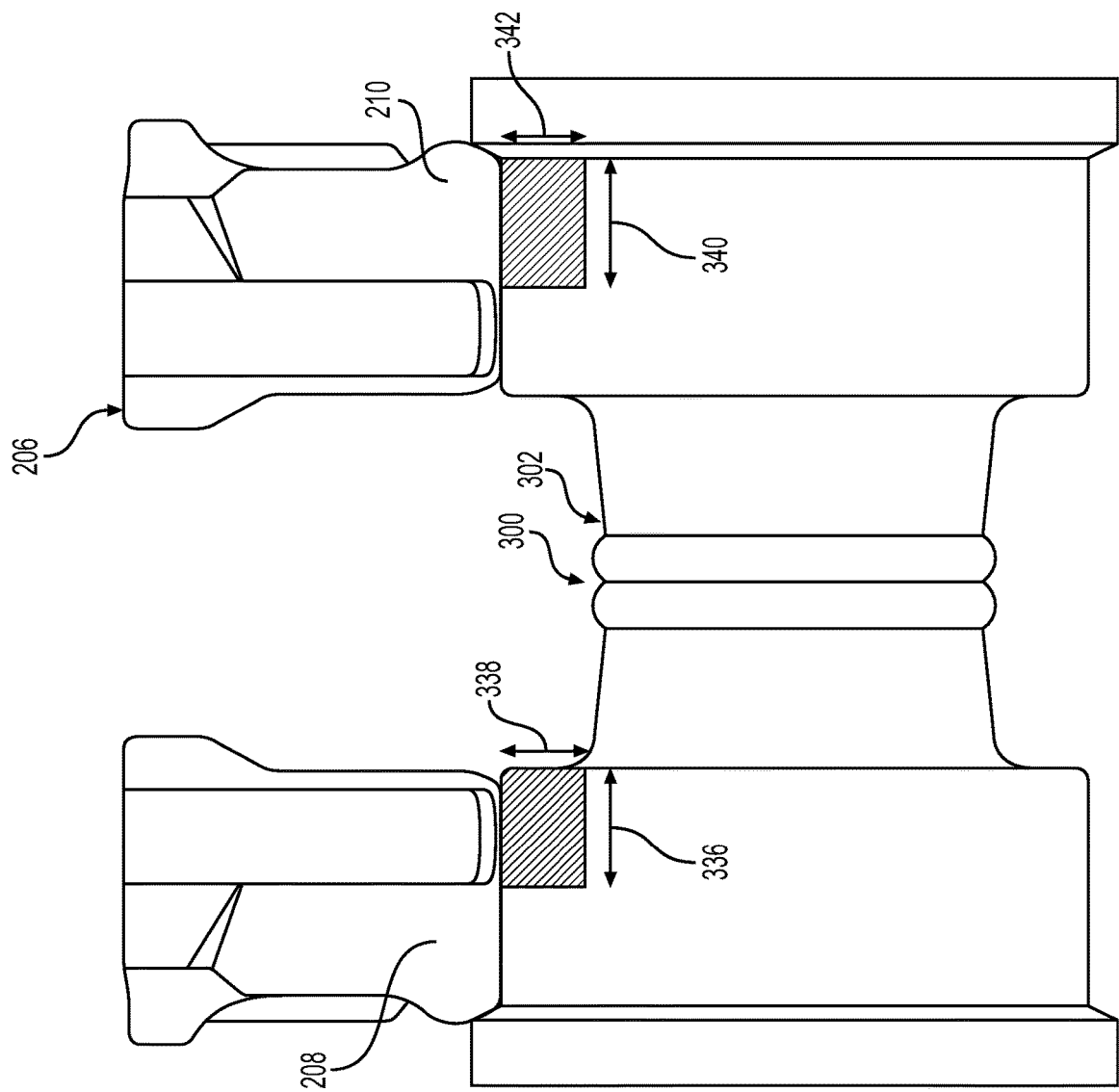
FIG. 5 is a front view of a portion of a track assembly with outboard links and inboard links that contact the alternating contact regions of a track roller formed by voids according to an embodiment of the present disclosure.
Figure 6:
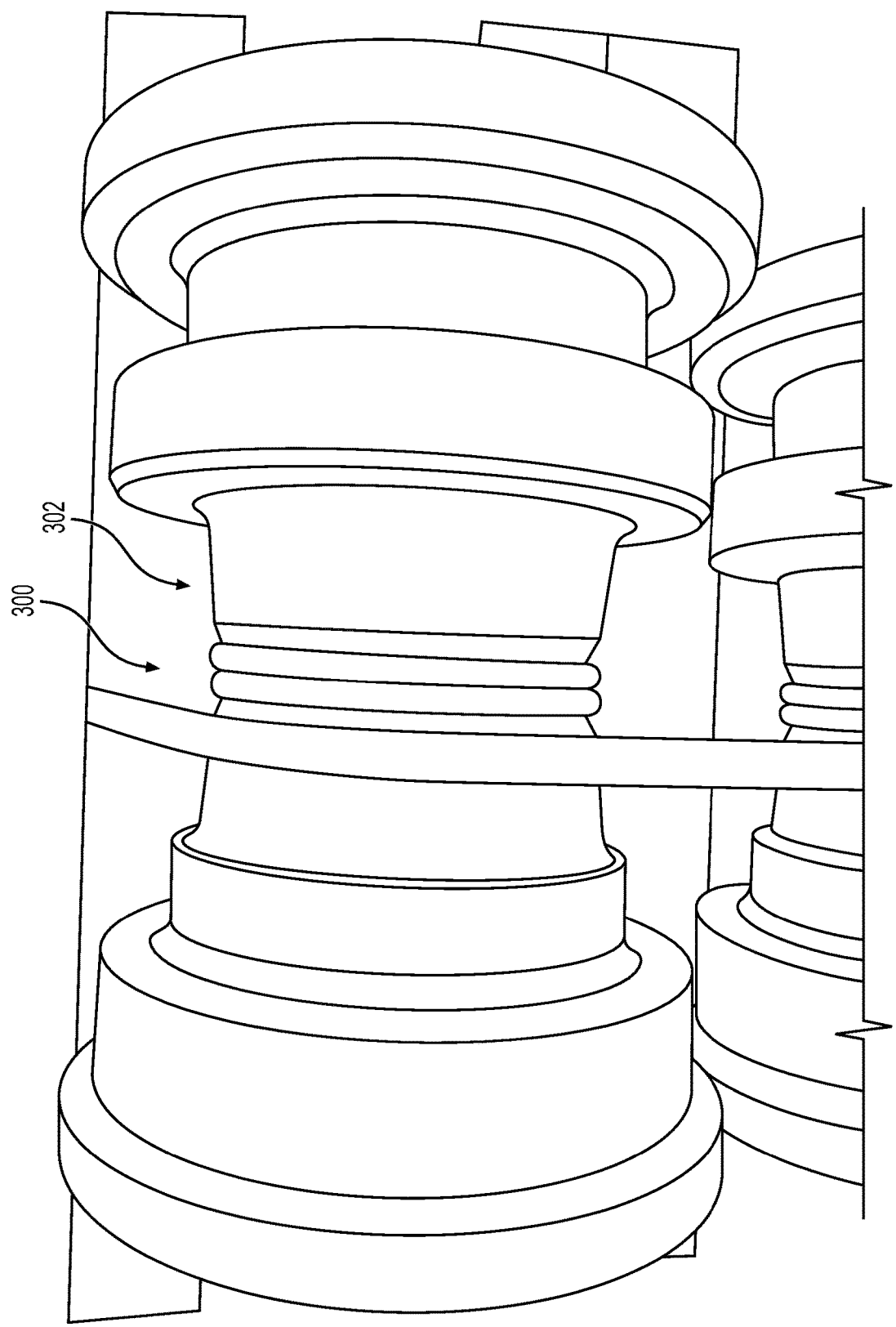
FIG. 6 is a perspective view of a track roller with alternating contact regions formed by rotating the voids about the axis of rotation of the track roller of FIG. 5. The track roller is shown packaged with a band to hold into place for shipping or storage.
Figure 7:
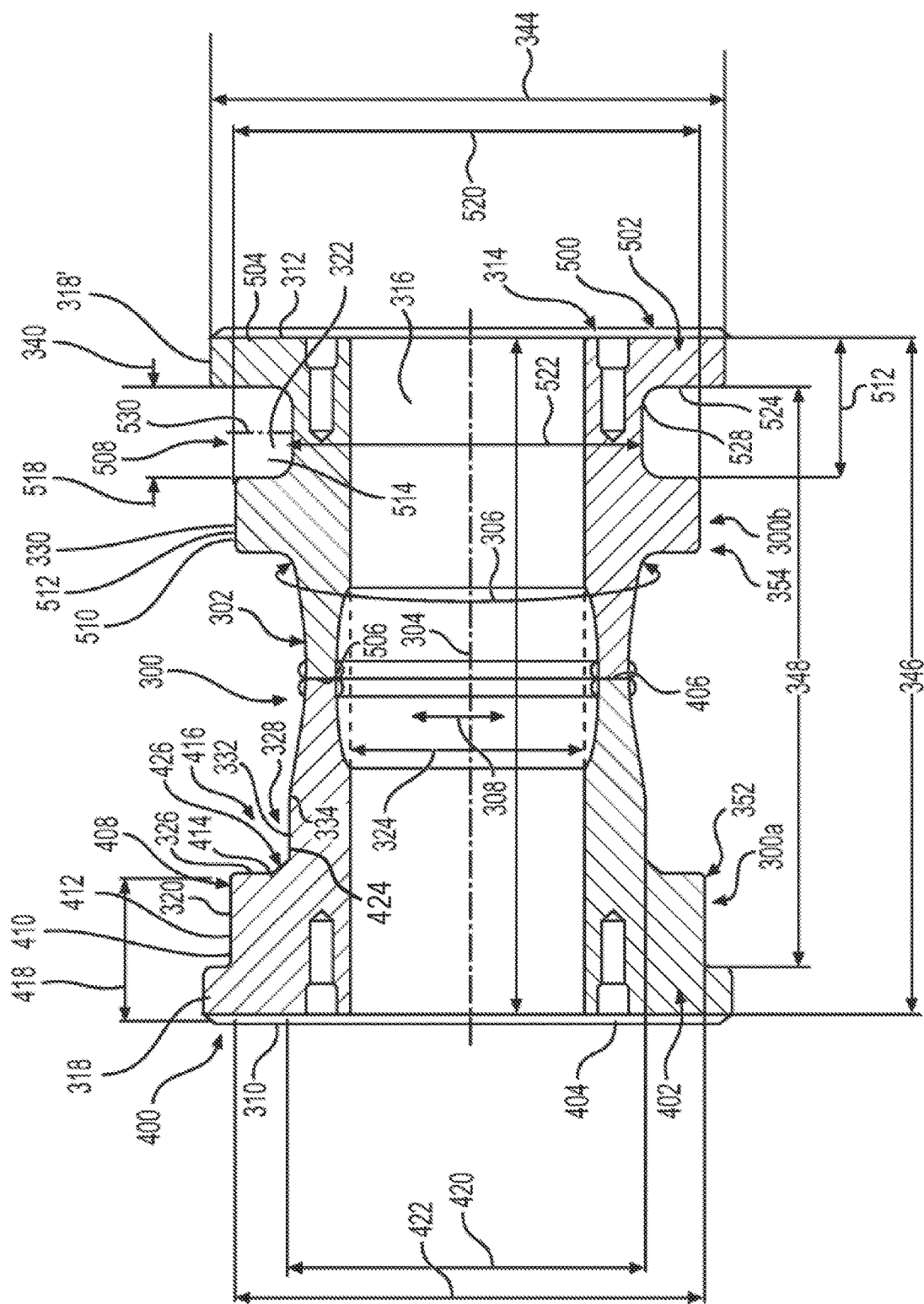
FIG. 7 is a front sectional view of the track roller of FIG. 6 shown in isolation and sectioned along a plane containing the radial direction and the axis of rotation.

Looking now at FIGS. 5 thru 7, it can be seen that the track roller 300 may include a body of revolution 302 (may be any type of body of revolution, with or without a hole, e.g. at least partially cylindrical, at least partially conical, etc.) defining an axis of rotation 304 (see FIG. 7), a circumferential direction 306 disposed about the axis of rotation 304, and a radial direction 308 extending normal to the axis of rotation 304. A first axial extremity 310 is disposed along the axis of rotation 304, and a second axial extremity 312 is disposed along the axis of rotation 304.

As used herein, the terms "axial" or "axially" includes a direction that makes an angle of less than 45 degrees with the axial direction while the terms "radial" or "radially" includes a direction that makes an angle of less than 45 degrees with the radial direction. "Purely" is meant to cover directions that are within 5 degrees of a stated direction. Relative terms such as "inboard" and "outboard" are to be understood to refer to a direction toward the interior of the machine or exterior of the machines respectively. However, it is to be understood that these terms may be switched by rotating a track roller joint assembly, a track roller, or a track roller members 180 degrees about a vertical axis. So, "inboard" and "outboard" should be interpreted broadly to cover embodiments where these features are so rotated.

As used herein, the articles "a" and "an" are intended to include one or more items, and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

The body of revolution 302 of the track roller 300 may further define an exterior 314, and a thru-hole 316 (see FIG. 7) that is in communication with the exterior 314 and extends axially through the body of revolution 302. A first rim portion 318 may be disposed proximate to the first axial extremity 310, and a second rim portion 318' may be disposed proximate to the second axial extremity 312. These features may be omitted in other embodiments. An outboard track contact surface 320 may be disposed axially proximate to the first rim portion 318, and an inboard slot 322 may be disposed axially proximate to the second rim portion 318'.

As can be understood with reference to FIG. 5, the inboard slot 322 may be formed by rotating a rectangular like cross-section about the axis of rotation and removing that material from the track roller 300. Other configurations of the inboard slot 322 or outboard slot 328 (as best seen in FIGS. 6 and 7) are possible in other embodiments of the present disclosure.

As best seen in FIG. 4, the shaft 202 may be disposed in the thru-hole 316, and a radial bearing 204 may be disposed in the thru-hole 316 that contacts the shaft 202. In other embodiments, the shaft may be integral with the body of the roller or the idler.

Looking at FIG. 7, the body of revolution 302 may further define a thru-hole minimum diameter 324, and may further include a purely radially inwardly extending segment 326 in a plane that contains the radial direction 308 and the axis of rotation 304. The purely radially inwardly extending segment 326 may be disposed axially proximate to the outboard track contact surface 320, and may at least partially define an outboard slot 328 that is disposed axially between the outboard track contact surface 320 and the inboard slot 322. An inboard track contact surface 330 may be disposed axially between the outboard slot 328, and the inboard slot 322.

A purely extending axial segment 332 may be provided that bounds the outboard slot 328, being spaced or offset radially inwardly away from the outboard track contact surface 320. This purely extending axial segment 332 may terminate at an end point 334 that is disposed axially between the outboard slot 328 and inboard track contact surface 330 such that the outboard slot 328 is open toward the second axial extremity 312. This might not be the case in other embodiments.

As shown in FIG. 5, an outboard slot axial width 336 may be measured from the purely radially inwardly extending segment 326 to the end point 335, and an outboard slot radial depth 338 that is measured from the outboard track contact surface 320 to the purely extending axial segment 332.

A ratio of the thru-hole minimum diameter 324 to the outboard slot axial width 336 ranges from 2.0 to 3.0, and a ratio of the thru-hole minimum diameter 324 to the outboard slot radial depth 338 ranges from 3.5 to 4.5. In such a case, the outboard slot axial width 336 may range from 50.0 mm to 60.0 mm (e.g. about 54.0 mm), and the outboard slot radial depth 338 may range from 30.0 mm to 40.0 mm (e.g. about 35.0 mm).

As also understood with reference to FIG. 5, the inboard slot 322 may define an inboard slot axial width 340, and an inboard slot radial depth 342. A ratio of the thru-hole minimum diameter 324 to the inboard slot axial width 340 may ranges from 2.0 to 3.0, and a ratio of the thru-hole minimum diameter 324 to the inboard slot radial depth 342 may range from 3.5 to 4.5. In such a case, the inboard slot axial width 340 may range from 50.0 mm to 60.0 mm (e.g. about 54.0 mm), and the inboard slot radial depth 342 may range from 30.0 mm to 40.0 mm (e.g. about 34.0 mm).

Referring now to FIG. 7, the first rim portion 318 and/or the second rim portion 318' define an overall diameter 344 of the track roller 300, an overall axial length 346 of the track roller 300, and a track link receiving barrel 348 defining a barrel axial width 350.

In some embodiments, the overall diameter 344 may range from 300.0 mm to 350.0 mm (e.g. about 321.0 mm), the overall axial length 346 may range from 350.0 mm to 450.0 mm (e.g. about 410.0 mm), and the barrel axial width 350 may range from 300.0 mm to 400.0 mm (e.g. about 342.8 mm).

Referring back to FIGS. 4 and 5, a track chain 206 including a plurality of track links 208 including a plurality of outboard portions 208 and a plurality of inboard portions 210 may be in contact with the track roller.

Looking at FIG. 7, the track roller 300 may be split into a first track roller member 300a, and a second track roller member 300b that are arranged axially in series, being attached to each other via welding, fastening, etc. The first roller member 300a may having a first half-tread portion 352 that is configured to contact at least one of the plurality of outboard portions 208 of the track chain 206, and the second roller member 300b may have a second half-tread portion 354 that is configured to contact at least one of the plurality of inboard portions 210 of the track chain 206. In other embodiments, the track roller 300 may constitute a single piece (or unitary construction).

This "flip-flop" arrangement may reduce the contact points between the roller and the track links into half, and may double the pressure on the track links. Furthermore, the flip-flop roller may be designed larger in diameter to compensate for reduced roller material. This may improve the track link life. Unexpectedly, tests have shown that even with commensurately higher contact pressures from reducing "contact" points, the wear life of the track links may be improved.

In other words, the track links may contact certain portions of the track roller and overhang the slots, increasing the contact pressures, which has unexpectedly been shown to increase the wear life of the track links, etc.

Any of the aforementioned features may be varied to be different than described herein or shown in the drawings. Also, any of the ranges of ratios or dimensions may also be varied in other embodiments to be different than described herein or shown in the drawings.

A track roller member 400 that may be used as part of the track roller 300 just described or as a replacement part will now be described with reference to FIG. 7.

The track roller member 400 may have a body 402 with a first axial end 404, and a second axial end 406 that are disposed along the axis of rotation 304. The body 402 may have a half-tread portion 408 including a first track contact region 410 having a first track contact surface 412 that is disposed axially proximate to the first axial end 404 (e.g. closer to the first axial end as compared to the second axial end), and defining a first void 416 that is disposed axially between the first track contact region 410 and the second axial end 406. The first void 414 may have any suitable configuration including a groove, a slot, a hole, etc.

A radially inwardly extending segment 414 is provided that at least partially defines the first track contact region 410, and the first void 416. The body 402 may further define a minimum axial distance 418 from the first axial end 404 to the radially inwardly extending segment 414. The first void 416 may define a first void minimum diameter 420.

In some embodiments, a ratio of the thru-hole minimum diameter 324 to the minimum axial distance 418 may ranges from 1.0 to 2.0, and a ratio of the first void minimum diameter 420 to the thru-hole minimum diameter 324 may range from 1.0 to 2.0.

In such a case, the thru-hole minimum diameter 324 may range from 100.0 mm to 200.0 mm (e.g. about 142.0 mm), the minimum axial distance 418 may range from 60.0 mm to 100.0 mm (e.g. about 83.0 mm), and the first void minimum diameter 420 may range from 150.0 mm to 300.0 mm (e.g. about 217.0 mm). Also, the first track contact surface 412 may define a first track contact region diameter 422 ranging from 250.0 mm to 325.0 mm (e.g. about 287.0 mm).

With continued reference to FIG. 7, the body 402 may further define a plurality of segments in the plane containing the radial direction 308, and the axis of rotation 304, forming the first void 416. The plurality of segments may include the radially inwardly extending segment 414 that is interposed radially between the first track contact surface 412, and the first void minimum diameter 420. An axially extending segment 424 may define the first void minimum diameter 420, and a radius 426 may connect the radially inwardly extending segment 414 to the axially extending segment 424. In some embodiments, the radius 426 may define a radius of curvature ranging from 10.0 mm to 20.0 mm (e.g. 15.0 mm).

Any of these features may be differently configured or dimensioned in other embodiments of the present disclosure. The ratios are also given as an example and not in any limiting sense.

Another track roller member 500 that may be used as part of the track roller 300 described above herein or as a replacement part will now be described with reference to FIG. 7.

The track roller member 500 may comprise a body 502 including a proximate axial end 504 that is disposed along the axis of rotation 304, and a distal axial end 506 that is disposed along the axis of rotation 304. A half-tread portion 508 including a first track interface region 510 including an interface surface 512 that is disposed proximate to the distal axial end 506, and defining a first aperture 514 that is disposed axially between the first track interface region 510 and the proximate axial end 504. The first aperture 514 may have any suitable configuration including a groove, a slot, a hole, etc.

The first track interface region 512 may be spaced away a minimum axial dimension 514 from the proximate axial end 504. The first aperture 514 may also define a first aperture axial width 518.

In some embodiments, a ratio of the thru-hole minimum diameter 324 to the minimum axial dimension 516 ranges from 1.0 to 2.0, and a ratio of the thru-hole minimum diameter 324 to the first aperture axial width 518 ranges from 2.0 to 3.0. In such a case, the thru-hole minimum diameter 324 may range from 100.0 mm to 200.0 mm (e.g. about 142.0 mm), the minimum axial dimension 516 may range from 60.0 mm to 100.0 mm (e.g. about 83.0 mm), and the first aperture axial width 518 may range from 40.0 mm to 70.0 mm (e.g. about 54.0 mm).

In addition, the interface surface 512 may define a first track interface region diameter 520 ranging from 250.0 mm to 325.0 mm (e.g. about 287.0 mm), and the first aperture 514 may define a first aperture minimum diameter 522 that ranges from 150.0 mm to 300.0 mm (e.g. about 217.0 mm).

With continued reference to FIG. 7, the body 502 may define a plurality of segments in the plane containing the radial direction 308, and the axis of rotation 304, forming the first aperture 514. The plurality of segments may include a first radially inwardly extending segment 524 that is interposed axially between the proximate axial end 504, and the first aperture minimum diameter 522, an axially extending segment 526 defining the first aperture minimum diameter 522, and a first blend 528 connecting the first radially inwardly extending segment 524 and the axially extending segment 526. The first blend 528 may define a radius of curvature ranging from 10.0 mm to 20.0 mm (e.g. about 15.0 mm) in some embodiments. Also, and the body 502 may also a plane of symmetry 530 that is parallel to the radial direction 308 such that the first aperture 514 is symmetrical about the plane of symmetry 530. This may not be the case for other embodiments of the present disclosure.

For many embodiments, the track roller or track roller member may be cast using iron, grey-iron, steel or other suitable materials. Other materials may be used as well as other manufacturing processes to make the track roller or track roller member such as any type of machining, forging, etc. Also, the configurations of any of the features discussed herein, as well as their dimensions, and/or their ratios of dimensions may be different than what has been specifically stated herein depending on the intended application.

INDUSTRIAL APPLICABILITY

In practice, a track roller, a track roller member, a track roller joint assembly, and an undercarriage assembly according to any embodiment described herein may be sold, bought, manufactured or otherwise obtained in an OEM (Original Equipment Manufacturer) or after-market context.

The various embodiments of the track roller, track roller member, or track roller joint assembly may improve the wear life of the track links or other components of the track roller joint assembly by increasing the contact pressures created at the interface between the track roller and the track links. This provides an unexpected result since convention wisdom is that decreasing contact pressures usually improve wear life rather than increasing contact pressures.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. A track roller member comprising:
   a body including a revolved configuration defining an axis of rotation, a radial direction, and a circumferential direction disposed about the axis of rotation, the body defining
   a proximate axial end disposed along the axis of rotation and a distal axial end disposed along the axis of rotation; and
   a half-tread portion including a first track interface region including an interface surface that is disposed proximate to the distal axial end and extending axially, that is configured to contact less than the full axial-direction width of an inboard portion of a track link and to bear a force, from the track link, that is primarily directed radially inwardly, and defining a first aperture disposed axially between the first track interface region and the proximate axial end,
   wherein the force creates a contact pressure.

2. The track roller member of claim 1 wherein the body further a defines a thru-hole extending axially through the body that is centered on the axis of rotation and a thru-hole minimum diameter, the first track interface region is spaced away a minimum axial dimension from the proximate axial end, the first aperture defines a first aperture axial width, a ratio of the thru-hole minimum diameter to the minimum axial dimension ranges from 1.0 to 2.0, and a ratio of the thru-hole minimum diameter to the first aperture axial width ranges from 2.0 to 3.0.

3. The track roller member of claim 2 wherein the thru-hole minimum diameter ranges from 100.0 mm to 200.0 mm, the minimum axial dimension ranges from 60.0 mm to 100.0 mm, and the first aperture axial width ranges from 40.0 mm to 70.0 mm.

4. The track roller member of claim 3 the interface surface defines a first track interface region diameter ranging from 250.0 mm to 325.0 mm, and the first aperture defines a first aperture minimum diameter that ranges from 150.0 mm to 300.0 mm.

5. The track roller member of claim 4 wherein the body defines a plurality of segments in the plane containing the radial direction and the axis of rotation, forming the first aperture, the plurality of segments including a first radially inwardly extending segment that is interposed axially between the proximate axial end and the first aperture minimum diameter, an axially extending segment defining the first aperture minimum diameter, and a first blend connecting the first radially inwardly extending segment and the axially extending segment, the first blend defining a radius of curvature ranging from mm to 20.0 mm, and the body defining a plane of symmetry that is parallel to the radial direction and the first aperture is symmetrical about the plane of symmetry.

6. A track roller joint assembly comprising:
a track roller including a
a body of revolution defining an axis of rotation, a circumferential direction disposed about the axis of rotation, a radial direction extending normal to the axis of rotation, a first axial extremity disposed along the axis of rotation, and a second axial extremity disposed along the axis of rotation, the body of revolution further including a first track roller member and a second track roller member,
the first track roller member including:
a first rim portion disposed proximate to the first axial extremity; and
an outboard track contact surface disposed axially proximate to the first rim portion;
the second track roller member including:
a proximate axial end disposed along the axis of rotation and a distal axial end disposed along the axis of rotation; and
a second rim portion disposed proximate to the second axial extremity;
a half-tread portion including a first track interface region including an interface surface that is disposed proximate to the distal axial end and extending axially, that is configured to contact less than the full axial-direction width of an inboard portion of a track link and to bear a force, from the track link, that is primarily directed radially inwardly, and defining a first aperture disposed axially between the first track interface region and the proximate axial end, wherein the force creates a contact pressure;
and the body of revolution further defining
an exterior;
a thru-hole that is in communication with the exterior and extending axially through the body of revolution;
an inboard slot disposed axially proximate to the second rim portion;

a shaft disposed in the thru-hole; and
a radial bearing disposed in the thru-hole and contacting the shaft.

7. The track roller joint assembly of claim 6 wherein the body of revolution further defines a thru-hole minimum diameter and further includes
a purely radially inwardly extending segment in a plane that contains the radial direction and the axis of rotation, the purely radially inwardly extending segment is disposed axially proximate to the outboard track contact surface, and at least partially defines an outboard slot that is disposed axially between the outboard track contact surface and the inboard slot; and
an inboard track contact surface that is disposed axially between the outboard slot and the inboard slot.

8. The track roller joint assembly of claim 7 wherein the body of revolution includes a purely extending axial segment that is radially inwardly offset from the outboard track contact surface and that terminates at an end point that is disposed axially between the outboard slot and inboard track contact surface, and the body of revolution further defines an outboard slot axial width measured from the purely radially inwardly extending segment to the end point and an outboard slot radial depth measured from the outboard track contact surface to the purely extending axial segment.

9. The track roller joint assembly of claim 8 wherein a ratio of the thru-hole minimum diameter to the outboard slot axial width ranges from 2.0 to 3.0, and a ratio of the thru-hole minimum diameter to the outboard slot radial depth ranges 3.5 to 4.5.

10. The track roller joint assembly of claim 9 wherein the outboard slot axial width ranges from 50.0 mm to 60.0 mm, and the outboard slot radial depth ranges from 30.0 mm to 40.0 mm.

11. The track roller joint assembly of claim 8 further comprising a plurality of track links including a plurality of outboard portions and a plurality of inboard portions; and
wherein the track roller is split into the first track roller member, and the second track roller member that are arranged axially in series with the first track roller member having a first half-tread portion that is configured to contact at least one of the plurality of outboard portions, and the second track roller member having a second half-tread portion that is configured to contact at least one of the plurality of inboard portions.

12. The track roller joint assembly of claim 7 wherein the body of revolution defines an inboard slot axial width, an inboard slot radial depth, a ratio of the thru-hole minimum diameter to the inboard slot axial width ranges from 2.0 to 3.0, and a ratio of the thru-hole minimum diameter to the inboard slot radial depth ranges from 3.5 to 4.5.

13. The track roller joint assembly of claim 12 wherein the inboard slot axial width ranges from 50.0 mm to 60.0 mm, and the inboard slot radial depth ranges from 30.0 mm to 40.0 mm.

14. The track roller joint assembly of claim 13 wherein the first rim portion or the second rim portion define an overall diameter of the track roller, an overall axial length of the track roller, and a track link receiving barrel defining a barrel axial width.

15. The track roller joint assembly of claim 14 wherein the overall diameter ranges from 300.0 mm to 350.0 mm, the overall axial length ranges from 350.0 mm to 450.0 mm, and the barrel axial width ranges from 300.0 mm to 400.0 mm.

* * * * *